United States Patent
Yamamoto et al.

(10) Patent No.: US 8,218,504 B2
(45) Date of Patent: Jul. 10, 2012

(54) MOBILE COMMUNICATION SYSTEM, ITS CONTROL DEVICE, HANDOVER CONTROL METHOD, AND MOBILE TERMINAL

(75) Inventors: Keiji Yamamoto, Ome (JP); Kazuya Negishi, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 531 days.

(21) Appl. No.: 12/510,522

(22) Filed: Jul. 28, 2009

(65) Prior Publication Data

US 2010/0020764 A1    Jan. 28, 2010

(30) Foreign Application Priority Data

Jul. 28, 2008   (JP) ................................ 2008-193923

(51) Int. Cl.
*G01R 31/08*   (2006.01)
*H04W 4/00*   (2009.01)
*H04W 36/00*   (2009.01)

(52) U.S. Cl. .................... 370/331; 370/252; 455/432.1; 455/436; 455/440

(58) Field of Classification Search .................. 370/248, 370/252, 254, 282, 328–331, 350; 455/432.1, 455/436–444
See application file for complete search history.

(56) References Cited

U.S. PATENT DOCUMENTS

| | | | |
|---|---|---|---|
| 7,072,663 B2 * | 7/2006 | Ramos et al. | 455/453 |
| 7,082,305 B2 * | 7/2006 | Willars et al. | 455/441 |
| 2003/0061351 A1 * | 3/2003 | Prathima et al. | 709/226 |
| 2004/0121770 A1 * | 6/2004 | Tigerstedt et al. | 455/436 |
| 2004/0235478 A1 * | 11/2004 | Lindquist et al. | 455/440 |
| 2005/0037756 A1 * | 2/2005 | Yaguchi et al. | 455/436 |
| 2005/0272428 A1 * | 12/2005 | Tanabe et al. | 455/439 |
| 2006/0176855 A1 * | 8/2006 | Oh et al. | 370/331 |
| 2006/0293060 A1 | 12/2006 | Yang et al. | |
| 2009/0069015 A1 | 3/2009 | Yamamoto et al. | |

FOREIGN PATENT DOCUMENTS

| | | |
|---|---|---|
| JP | 5-14265 | 1/1993 |
| JP | 8-154267 | 6/1996 |
| JP | 9-149452 | 6/1997 |
| JP | 09-261717 | 10/1997 |
| JP | 11-266198 | 9/1999 |
| JP | 2002-10317 | 1/2002 |
| JP | 2002-232929 | 8/2002 |

OTHER PUBLICATIONS

Notice of Reasons for Rejection in counterpart JP 2008-193923 mailed by the Japanese Patent Office on Apr. 6, 2010 (2 pages) with English translation (2 pages).

(Continued)

*Primary Examiner* — Andrew Lai
*Assistant Examiner* — Redentor Pasia
(74) *Attorney, Agent, or Firm* — Finnegan, Henderson, Farabow, Garrett & Dunner, L.L.P.

(57) ABSTRACT

According to one embodiment, a mobile communication system includes base stations each forming a wireless zone for wirelessly accommodating mobile terminals, and a control device accommodating the base stations. The control device includes a construction module, a prediction module and an instruction module. The construction module constructs a database regarding a history of handovers by the mobile terminals. The prediction module predicts a base station of the next connection destination of a mobile terminal being in communication and timing of a handover to the base station of the next connection destination on the basis of the database. The instruction module instructs the handover to the predicted base station to the mobile terminal being in communication before the timing comes.

22 Claims, 10 Drawing Sheets

| Immediately preceding base station | Base station | Base station No. 1 | | Base station No. 2 | | Base station No. 3 | | ... |
|---|---|---|---|---|---|---|---|---|
| | | Period ratio | Frequency | Period ratio | Frequency | Period ratio | Frequency | ... |
| CS2 | CS1 | CS3 | | CS4 | | CS5 | | ... |
| | | 2 | 138 | 1.5 | 220 | 0.8 | 48 | |
| CS3 | | CS5 | | CS2 | | CS4 | | ... |
| | | 2.5 | 236 | 0.67 | 459 | 0.9 | 1023 | |
| CS4 | | CS2 | | CS3 | | CS5 | | ... |
| | | 1.8 | 245 | 0.5 | 35 | 0.75 | 341 | |
| : | : | : | : | : | : | : | : | ... |
| CS1 | CS2 | CS3 | | CS5 | | CS4 | | ... |
| | | 3 | 568 | 2.1 | 173 | 0.33 | 95 | |
| : | : | : | : | : | : | : | : | ... |

44d

OTHER PUBLICATIONS

Negishi et al., U.S. Appl. No. 12/358,585, filed Jan. 23, 2009, entitled Mobile Communication System, Control Device Thereof, Mobile Terminal, and Database Constructing Method.

Negishi et al., U.S. Appl. No. 12/470,244, filed May 21, 2009, entitled Mobile Communication System, Its Control Device, and Hand-Off Control Method.

* cited by examiner

| Immediately preceding base station | Base station | Base station No. 1 | | Base station No. 2 | | Base station No. 3 | | ... |
|---|---|---|---|---|---|---|---|---|
| | | Period ratio | Frequency | Period ratio | Frequency | Period ratio | Frequency | ... |
| CS2 | CS1 | CS3 | | CS4 | | CS5 | | ... |
| | | 2 | 138 | 1.5 | 220 | 0.8 | 48 | |
| CS3 | | CS5 | | CS2 | | CS4 | | ... |
| | | 2.5 | 236 | 0.67 | 459 | 0.9 | 1023 | |
| CS4 | | CS2 | | CS3 | | CS5 | | ... |
| | | 1.8 | 245 | 0.5 | 35 | 0.75 | 341 | |
| ⋮ | ⋮ | ⋮ | | ⋮ | | ⋮ | | ... |
| CS1 | CS2 | CS3 | | CS5 | | CS4 | | ... |
| | | 3 | 568 | 2.1 | 173 | 0.33 | 95 | ... |
| ⋮ | ⋮ | ⋮ | | ⋮ | | ⋮ | | ... |

44d

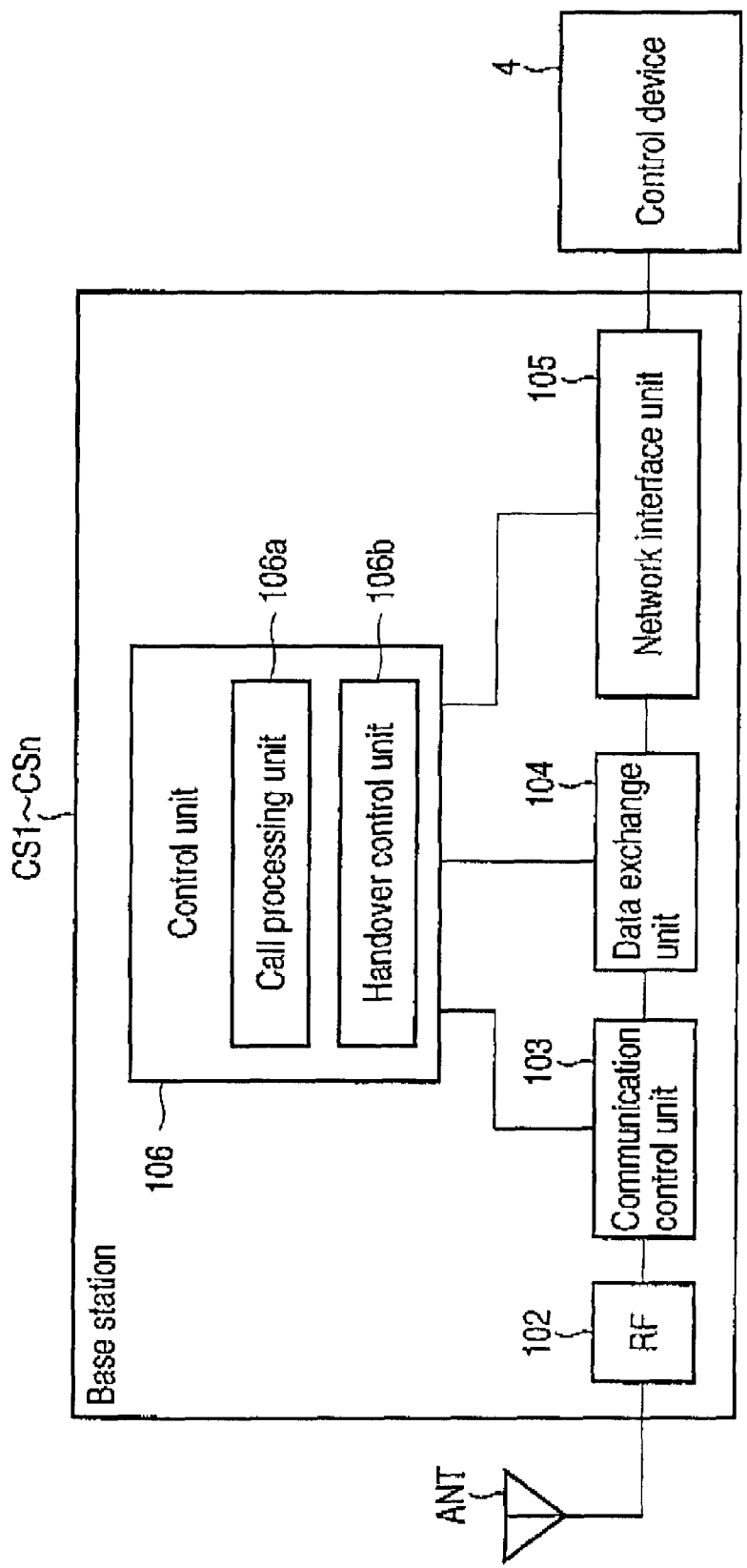
F I G. 6

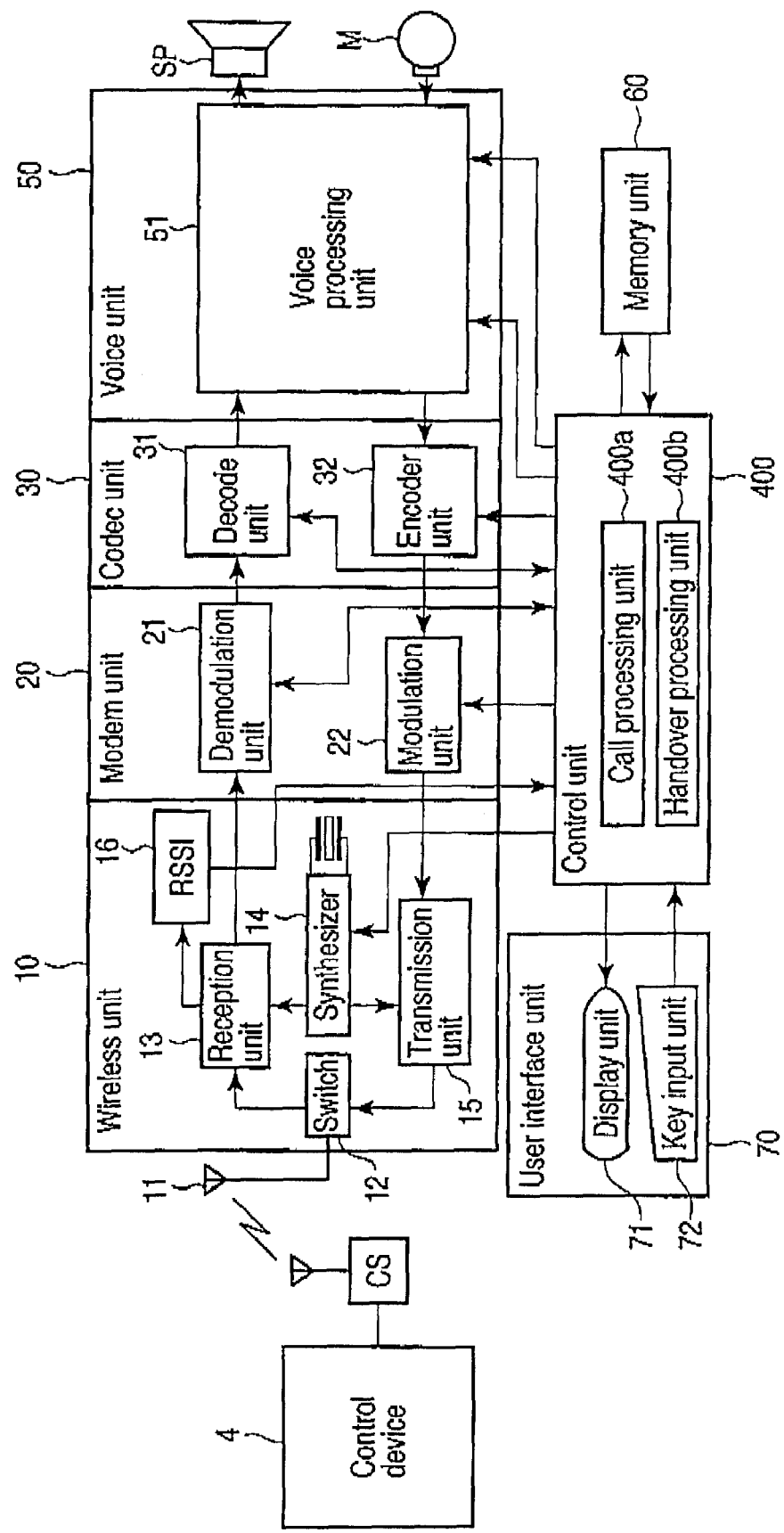
F I G. 7

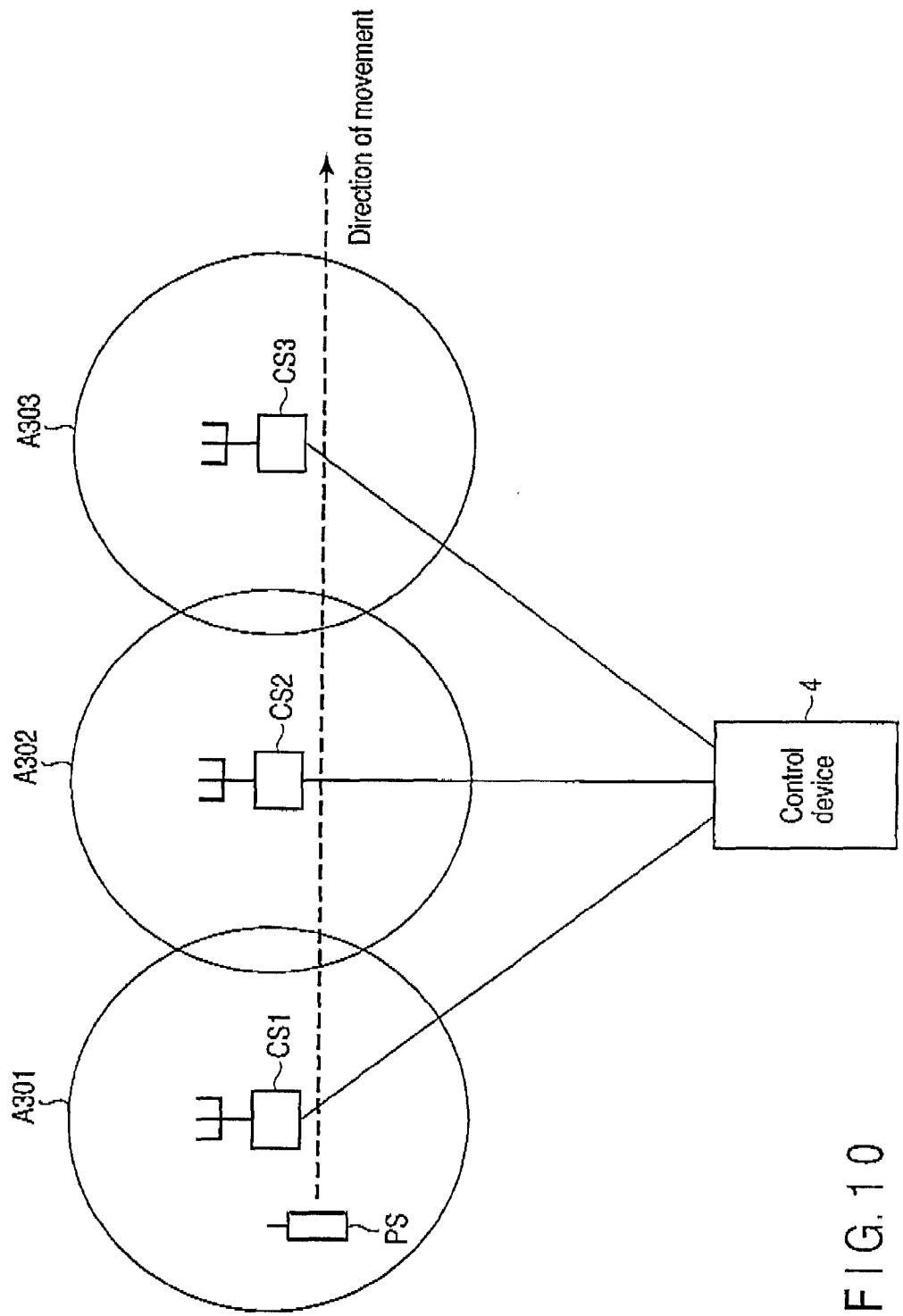
F I G. 10

MOBILE COMMUNICATION SYSTEM, ITS CONTROL DEVICE, HANDOVER CONTROL METHOD, AND MOBILE TERMINAL

CROSS-REFERENCE TO RELATED APPLICATIONS

This application is based upon and claims the benefit of priority from prior Japanese Patent Application No, 2008-193923, filed Jul. 28, 2008, the entire contents of which are incorporated herein by reference.

BACKGROUND OF THE INVENTION

1. Field of the Invention

One embodiment of the present invention relates to an improvement of a mobile communication system that forms areas, for example, in a micro cell system.

2. Description of the Related Art

Systems in which a mobile communication system forms areas are classified roughly into macro cell systems and micro cell systems. A representative of the former is a so-called cellular phone system, and the radius of each wireless area reaches several kilometers. A Personal Handy-phone System (PHS) adopts the latter system, and the radius of each wireless area is very small and is on the order of no more than several hundred meters, For the micro cell system, the number of base stations is frequently increased or decreased in response to changes in communication demand in areas. According to such a situation, station installation design is not usually performed in order to establish the base stations. The resulting interference among areas avoids crosstalk by independently coping with it through each base station.

In this kind of system, when handovers (also referred to as handoffs)are performed, areas are switched in accordance with re-calling from mobile terminals. Since handovers occur frequently in the micro cell system, the system may not be able to suitably cope with high-speed movements of mobile terminals, thus posing a problem. Under the present circumstances, however, the performance of handover depends greatly on the performance of the terminal (see, for example, Jpn. Pat. Appln. KOKAI Publication No. 5-14265). For instance, an enhancement of high-speed movement performance by using such technique in this reference increases mobile terminal costs, and increases the burden on users. In this technique, since it is necessary to specify ranges of communication areas (zones) in advance for implementation of the technique, this technique cannot be applied to a system in which station installation design is not performed.

BRIEF SUMMARY OF THE SUMMARY

As mentioned above, in an existing mobile communication system, there is still room for improvement in handover performance. A technical innovation that enables improvement of the high-speed performance has therefore been desired.

The present invention is made under the foregoing circumstances, and an object of the invention is to provide a mobile communication system configured to improve the high-speed performance, its control device, a handover control method, and a mobile terminal.

To achieve the aforementioned object, a mobile communication system according to one embodiment of the invention includes a plurality of base stations each forming a wireless zone, a plurality of mobile terminals which perform handovers to different base stations with the movements of the mobile terminals among wireless zones, and a control device accommodating each base station through a communication resource for each base station. The control device includes a structure module, a prediction module and an instruction module. According to one embodiment of the invention, each mobile terminal comprises handover processing units which perform handovers on the basis of the instructions from the instruction module.

The structure module structures a database for predicting the timing of handovers and base stations of their partners with storage of histories of handovers which have been performed in the mobile communication system. The database associates a frequency of occurrences of permutations with statistical information showing ratios of communication periods to the first and the second base stations of the permutation by means of the same mobile terminal, for each permutation comprising three sequentially arranged base stations.

It is assumed that there are, for example, a plurality of base stations CS1, CS2, CS3 and CS4, the permutations sequentially arranging three of them are (CS1, CS2, CS3), (CS1, CS2, CS4), (CS1, CS3, CS2), (CS1, CS3, CS4), (CS1, CS4, CS2), (CS1, CS4, CS3), (CS2, CS1, CS3), (CS2, CS1, CS4), (CS2, CS3, CS1), (CS2, CS3, CS4), (CS2, CS4, CS1), (CS2, CS4, CS3), (CS3, CS1, CS2), (CS3, CS1, CS4), (CS3, CS2, CS1), (CS3, CS2, CS4), (CS3, CS4, CS1), (CS3, CS4, CS2), (CS4, CS1, CS2), (CS4, CS1, CS3), (CS4, CS2, CS1), (CS4, CS2, CS3), (CS4, CS3, CS1), (CS4, CS3, CS2), each of which includes three base stations from the base stations CS1, CS2, CS3 and C4. For instance, in permutation (CS2, CS1, CS4), the first is the base station CS2, the second is the base station CS1, and the third is the base station CS4.

As the mobile terminals repeat handover to the base stations, and as the time elapses, permutations sequentially arranging connection destination base stations, for example, (CS1, CS4, CS2)→(CS4, CS2, CS3) occur sequentially. The database is one in which the frequencies of occurrences of the permutations or the number of times thereof are associated with one another for each permutation. Some of permutations may not occur, depending on the types of arrangement of the base stations. For instance, the base stations separated from one another may not have been mutually included in the same permutation regardless of the time elapsed. It is not required for such permutations to be provided with data storage areas.

Further, statistical information on the time is associated for each permutation. The statistical information shows a ratio of communication periods of mobile terminals regarding the first base station and the second base station in the permutation. For instance, if a certain mobile terminal is connected to the base station CS1 for 30 sec., and to the base station CS4 for 120 sec., four, which is the ratio between 30 and 120, is associated with the foregoing permutation (CS1, CS4, CS2).

Using this statistical information enables predicting the timing of the occurrence of handover. For instance, if a period in which another mobile terminal is connected to the base station CS1 is 15 sec., the connection period to the base station C4 during connection at this moment may be predicted on statistic information of 15 sec.×4=60 sec. Adding this value to the handover time to the base station C4 enables predicting the timing of the handover to the next connection destination, which is the base station CS2.

Further, a base station as a possible partner can be predicted. For instance, the next handover destination for the mobile terminal which has performed a handover from the base stations CS1 to CS4 may be selected as the third base station if a permutation with a maximum frequency is specified using a frequency of a plurality of permutations (CS1, CS4, CS2), and (CS1, CS4, CS3) as a standard.

The foregoing database is structured by means of the structure module, and the handover destination and its timing are predicted by means of the prediction module.

That is, since the system side may predict a base station for a handover destination (a base station of the next connection destination), the system can perform handovers on the network side, instead of by the mobile terminal itself. Thereby, utilizing sufficient resources enables speeding up of the handovers. Further, since parts relating to the processing performed by the mobile terminal can be omitted, the cost of terminals can be reduced.

According to the invention, the mobile communication system of which the high-speed movement performance is improved, its control device, the handover control method, and the mobile terminal may be provided.

Additional advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 6 is an exemplary block diagram depicting a base station CS shown in FIG. 1;

FIG. 7 is an exemplary block diagram depicting a mobile terminal PS;

FIG. 10 is an exemplary view for explaining prediction of a handover destination base station and its timing;

DETAILED DESCRIPTION OF THE INVENTION

Figure 1:
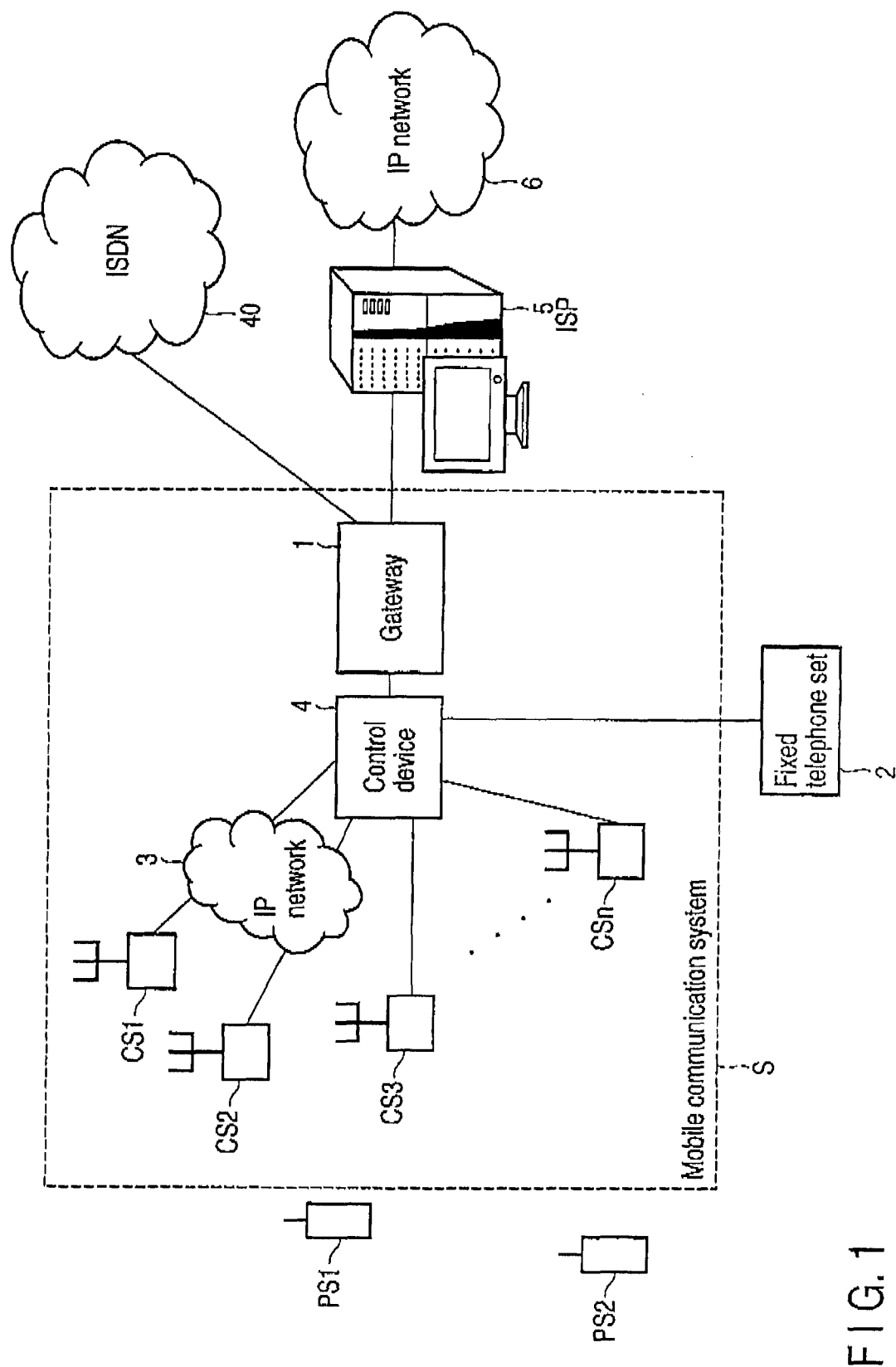
FIG. 1 is an exemplary system view depicting an embodiment of a mobile communication system of the invention.

FIG. 1 shows a system view illustrating an embodiment of a mobile communication system of the invention. A mobile communication system S in FIG. 1 is formed mainly of a plurality of base stations CSs (CS1-CSn) and a control device 4 accommodating these base stations CS1-CSn therein through communication resources. The communication resources include wired lines, Integrated Service Digital Network (ISDN) lines, or packet lines passing through an Internet Protocol (IP) network 3. Wireless lines may be used. In the embodiment, unifying the protocols of the communication resources makes it convenient as regards system mounting. Other than this, a fixed telephone set 2 may be connected to a control device 4.

The base stations CS1-CSn form wireless zones, respectively, and each of these zones wirelessly accommodate mobile terminals PSs (PS1, PS2). With movements among wireless zones, the mobile terminals PSs (PS1, PS2) perform handovers and sequentially switchover base stations of connection destinations. Naturally, the number of mobile terminals is not limited to two.

The control device 4 is connected to a communication network through a gateway 1. The communication network is an exchange network such as an ISDN 40, or an IP network 6 passing through an Internet service provider (ISP) 5. The IP network 6 is a wide-area Ethernet (registered trademark) or a packet communication network of an IP-virtual private network (IP-VPN) connection service. The gateway 1 has a protocol conversion function for connecting these different kinds of networks and the mobile communication system S to each other. The gateway 1 executes communication protocol conversion if protocol conversion among different networks is needed, and forms a communication channel to and from opposed devices (such as Internet gateways) in accordance with a communication type to establish end-to-end communication.

Figure 2:
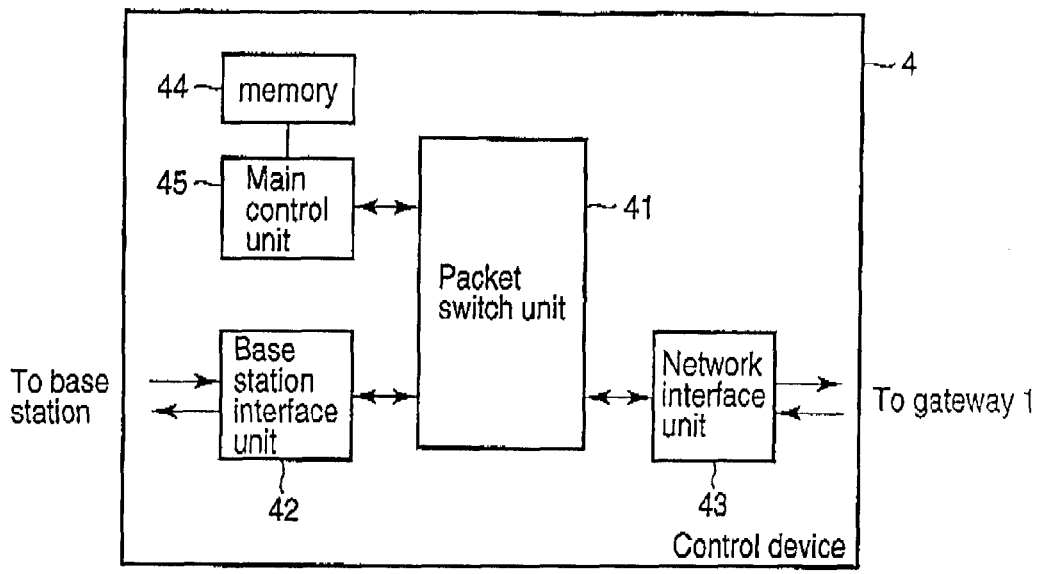
FIG. 2 is an exemplary functional block diagram depicting a control device 4 shown in FIG. 1.

FIG. 2 shows a functional block diagram illustrating the control device 4 shown in FIG. 1. The control device 4 comprises a packet switch unit 41, a base station interface unit 42, a network interface unit 43, a memory 44, and a main control unit 45. Of these units, the base station interface unit 42 executes interface processing for accommodating the base stations CS1-CSn through the communication resources. The network interface unit 43 executes interface processing for connecting the control device 4 to the communication network through the gateway 1.

Both the base station interface unit 42 and the network interface unit 43 transmit and receive IP packets, and the packet switch unit 41 disposed between the interface units 42, 43 performs packet exchange. Within the main control unit 45, the control device 4 integrally controls various operations, including packet exchange, and the memory 44 stores a control program and a variety of items of setting data.

That is, the control device 4 processes a digital signal such as audio data, video data, and image data to be transmitted and received between the mobile terminal PS and its communication partner, and data for providing various services in accordance with a specified communication type.

Figure 3:
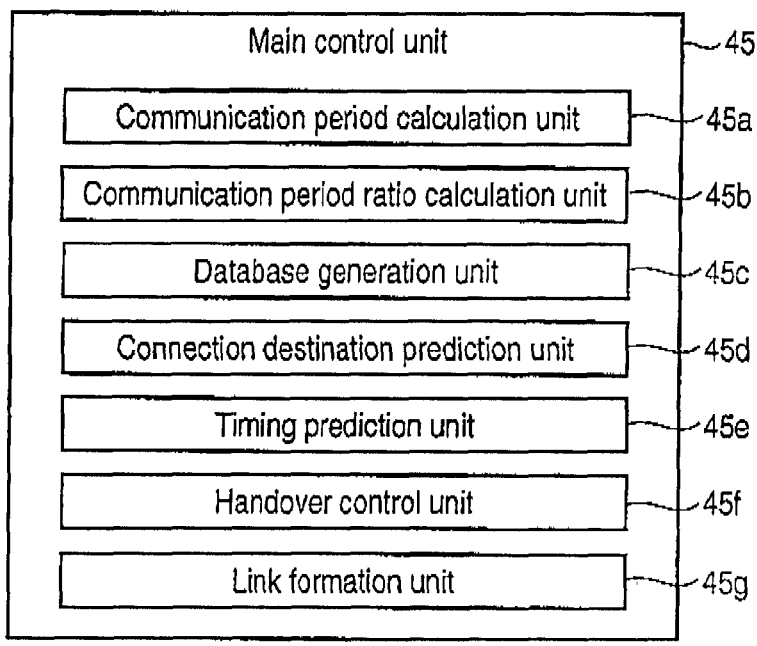
FIG. 3 is an exemplary block diagram depicting a function provided for a main control unit 45 shown in FIG. 2.

FIG. 3 shows a block diagram illustrating a function regarding the main control unit 45 shown in FIG. 2. The main control unit 45 includes a communication period calculation unit 45a, a communication period ratio calculation unit 45b, a database generation unit 45c, a connection destination prediction unit 45d, a timing prediction unit 45e, a handover control unit 45f, and a link formation unit 45g. The processing function of any of these units can be executed via computation processing by a central processing unit (CPU) based on a command described in a program stored in the memory 44.

Both the communication period calculation unit 45a and the communication period ratio calculation unit 45b acquire and process the data generated through handovers performed by the mobile terminals PSs. These data are stored as histories with occurrences of events such as calls, connections, movements, and talking terminations, with elapsed time. While the histories are stored in the control device 4, the histories may also be stored in a server (not shown) for collecting event information.

The communication period calculation unit 45a calculates a period in which each mobile terminal PS communicates with each base station CS as the mobile terminals PSs repeat handover. The communication period may be defined as a period from the time when a handover to a certain base station is completed up to the time of a handover to the next base station. Or, the communication period may be defined as a period from the time of transmission of the first packet up to the time of transmission of the last packet for each base station regardless of handover. In short, the communication period is information in which the period of the connection of the mobile terminal PS is processed as data.

Figures 4, 5:
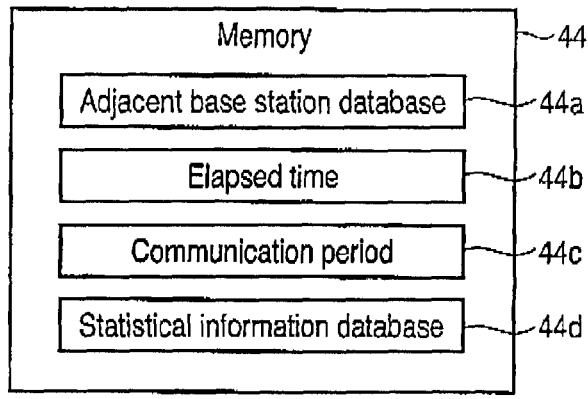
FIG. 4 is an exemplary view depicting an example of information stored in a memory 44 shown in FIG. 3.
FIG. 5 is an exemplary view depicting an example of a statistical information database 44d shown in FIG. 4.

The communication period ratio calculation unit 45b calculates the ratio of a communication period for each base station. The ratio is defined between adjacent base stations. For instance, if the mobile terminal PS1 performs handovers to the base stations CS1, CS2, CS3 in this order, and if communication periods are 30 sec., 120 sec., 45 sec., respectively, the communication period ratio of the base station CS2 to the base station CS1 becomes four, and the communication period ratio of the base station CS3 to the base station CS2 becomes 0.375. The database generation unit 45c constructs a database, as shown in FIG. 5, on the basis of the calculated communication period ratio and the history of the handovers. This database is one in which the order of the base stations to which handovers have been performed are expressed in a permutation, and the number of times (frequency) of the occurrences of the handovers and the communication period ratios are associated with one another.

The connection destination prediction unit 45d predicts the base station of the next connection destination of the mobile terminal PS being in communication on the basis of the number of times recorded in the database. The timing prediction unit 45e predicts the timing of performing handover to the predicted base station on the basis of the communication period ratio. The handover control unit 45f instructs a handover to a mobile terminal so as the handover is performed at the predicted timing. This instruction has a form such as a message packet, and is given before the predicted timing comes. If solely an identifier of the partner and the command of the handover are described in a message, the message should be sent at the predicted timing or just before it.

If the timing is described in the message, the mobile terminal reads the timing from the time information to perform a handover at such timing. In this way, the message may be sent with a certain margin before such timing.

Before completion of the handover of the mobile terminal PS, the link formation unit 45g forms a communication link in a communication resource at the base station CS of the handover destination. The communication link is a link for continuing communication between the mobile terminal PS being currently in communication, and its partner. In this way, forming the link prior to the timing of the handover enables preventing interception of a call and also enables accelerating the handover without wasting time, and enables preventing interception of the call. In the embodiment, this is one merit obtained by making it possible to predict the base station of the next connection destination and its timing.

FIG. 4 shows a view illustrating an example of information stored in the memory 44 shown in FIG. 3. The memory 44 stores an adjacent base station database 44a, an elapsed time 44b, a communication period 44c, and statistical information database 44d. The adjacent base station database 44a forms a database by a combination of another adjacent base station for each base station. In a system such as PHS which does not perform installation design, the base station database 44a is structured with storage of the histories of handovers. The base station database 44a includes data forming the basis of the statistical information database 44d shown in FIG. 5.

The elapsed time 44b is a database for managing the elapsed time from the handover of the mobile terminal PS being in communication. The information showing which mobile terminal has performed its handover to which base station is reported to a system in an event report to be managed sequentially in the system. The elapsed time 44b is managed for each link currently established on the basis of the report which has been made in the way given above. The communication period 44c is data calculated by the communication period calculation unit 45a shown in FIG. 3, and for example, the communication period 44c comprises the elapsed time from one handover to the next handover for each mobile terminal PS saved in a database.

FIG. 5 shows a view illustrating an example of the statistical information database 44d shown in FIG. 4. The statistical information database 44d is structured by means of the database generation unit 45c as the histories of the handovers are stored. The statistical information database 44d has a form in which the immediately preceding base station and a plurality of base stations (base station No. 1, No. 2, No. 3, ... ) are associated with one another. The immediately preceding base station means, when attention is focused on a certain base station (called a present station), a base station (previous station) to which the mobile terminal PS was connected before the present station. FIG. 5 shows that the immediately preceding base stations to the base station CS1 are base stations CS2, CS3, CS4, and this means that there is a history in which the handovers to the base station CS has been performed from any of the base station CS2, CS3, CS4. Meanwhile, if the base station CS10 is far away from the base station CS1, that relationship given above does not occur. In other words, the statistical information database 44d and the base station database 44a have a close relationship with each other.

Base stations No. 1, No. 2, No. 3 are lists of the base stations which are possibly performed the handovers to the next stations on which the attentions are focused. These base stations are listed as regards relationships between the previous stations and the present stations. For instance, if a certain mobile terminal PS performs handover in the order of the base station CS2-CS1, the list shows that any one of the base stations CS3, CS4, CS5, ..., may be the one involved in the next handover. The communication period ratios, and the times of the handovers are associated with one another for each combination of base stations.

Regarding the database structure, the statistical information database 44d may be regarded as a database in which three base stations are associated with one another by using the communication period ratios and the number of times as parameters for each permutation of sequentially arranged base stations. For instance, 2 and 138 are associated with a time ratio and the number of times, respectively, with respect to permutation (CS2, CS1, CS3). Likewise, 2.5 and 236 are associated with a time ratio and the number of times with respect to permutation (CS3, CS1, CS5). These figures are data calculated on the basis of the histories of the handovers which have been performed in the mobile communication system S.

Among the parameters, the number of times is a frequency of the occurrences of the permutations. That is, the number of times of the handovers of the mobile terminal CS2 in order of CS2 CS1 CS3 is 138. Only the number of times of the handovers is recorded, and no specification about the mobile terminal which has performed the handover is recorded. The communication period ratio is a value associating the ratio between the communication period of the first base station in the permutation and the communication period of the second base station therein with the third base station therein.

For instance, when the mobile terminal PS performs a handover in order of CS2→CS1→CS3, the statistical information database 44d shows that the ratio of the communication period to the base station CS2 from the CS1 is 2. This value is, for example, an averaged value of the history over 138 times. In order of CS2 CS1→CS5, the statistical information database 44d shows that the ratio of the communication period to the base station CS2 from the base station CS1 is 2.5. In this way, the statistical information database 44d is, for each permutation sequentially arranging three base stations, a database in which the number of times of appearances of the permutations and the communication period ratio of the identical mobile terminals to the first and the second base stations in the permutation are associated with one another.

FIG. 6 shows a functional block diagram illustrating the base station CSs (CS1-CSn) shown in FIG. 1. The base station CS includes an antenna ANT, a wireless unit (RF) 102, a communication control unit 103, a data exchange unit 104, a network interface unit 105, and a control unit 106.

The wireless unit 102 transmits and receives a high-frequency wireless signal through the antenna ANT to and from the mobile terminal PS. The communication control unit 103 performs signal processing and control regarding wireless transmission/reception such as modulation and demodulation of communication data. The data exchange unit 104 performs multiplexing of transmission data and separation processing of the reception data in accordance with a modulation system defined in Time Division Multiple Access-Time Division Duplex (TOMA-TDD) or orthogonal Frequency Division Multiplexing Access (OFDMA). The network interface unit 105 is connected to the control device 4 through the communication resources, and performs interface processing for connecting the base stations CSs to the communication network.

The control unit 106 includes a call processing unit 106a and a handover control unit 106b. The call processing unit 106a performs overall control for connecting the mobile terminals PSs and the calls to their partners. The handover control unit 106b performs overall control regarding the handovers with movements of the mobile terminals PSs.

FIG. 7 shows a functional block diagram illustrating the mobile terminals PSs shown in FIG. 1. The mobile terminal PS1 includes a wireless unit 10, a modem unit 20, a codec unit 30, a voice unit 50, a memory unit 60, a user interface unit 70 and a control unit 400. In FIG. 7, a wireless-frequency signal to be transmitted from the base station CS through a wireless channel is received by an antenna 11 of the wireless unit 10, and input to a reception unit 13 through a high-frequency switch 12. The reception unit 13 mixes the wireless frequency signal with a reception local oscillation signal generated by a frequency synthesizer 14 to be frequency-converted into a reception intermediate-frequency signal. The oscillation frequency of the synthesizer 14 is instructed from the control unit 400 in response to a wireless channel frequency. The wireless unit 10 is provided with a received signal strength indicator (RSSI) 16. The RSSI 16 detects an RSSI value of the wireless frequency signal that has arrived from the base station CS, and the detected value is reported to the control unit 400.

The reception intermediate-frequency signal output from the reception unit 13 is input to a demodulation unit 21 of the modem unit 20. The demodulation unit 21 digitally-demodulates the intermediate-frequency signal, thereby a digital voice signal is reproduced. A decode unit 31 of the codec unit 30 breaks down the foregoing digital voice signal for each time slot in accordance with the instruction from the control unit 400. Among the broken down plurality of digital voice signals, a digital voice signal of the slot directed to its own terminal is input in the voice unit 50.

The voice unit 50 has a voice processing unit 51, and the digital voice signal is decoded by the voice processing unit 51 to be reproduced into an analog voice signal. The analog voice signal is amplified by a reception amplifier (not shown) to be output from a loudspeaker SP.

Meanwhile, a transition voice input to a microphone M is encoded by the voice processing unit 51 into a digital voice signal, and input to an encoder unit 32. The encoder unit 32 inserts the digital voice signal output from the voice processing unit (trans coder) 51 into a time slot instructed from the control unit 400 to be input to the modulation unit 22. The modulation unit 22 digitally-modulates a carrier wave signal by the digital voice signal. The carrier wave signal modulated in this way is input to a transmission unit 15.

The transmission unit 15 mixes the modulated carrier wave signal with a transmission local oscillation signal generated by the synthesizer 14, frequency-converts the mixed signal into the wireless channel frequency instructed by the control unit 400, and amplifies the carrier wave signal to a predetermined transmission power level. The wireless frequency signal frequency-converted and signal-amplified by the transmission unit 15 is transmitted toward the base station CS by the antenna 11 through the high-frequency switch 12.

The memory unit 60 uses a semiconductor memory as a storage medium, and the storage medium stores a variety of items of control data, a variety of items of setting data, and dial data such as abbreviated dialing numbers and a telephone directory, as well as a control program for the control unit 400, and ID data of its own terminal required for authentication. The user interface unit 70 includes a display unit 71 and a key input unit 72. The display unit 71 displays a state (transmission/reception, battery remaining amount, reception strength) of its own terminal and the dial data read from the memory unit 60 on, for example, a liquid crystal display (LCD), and visually shows a variety of items of information to a user. The key input unit 72 includes a function setting key for performing various kinds of setting such as switching of an incoming call report method (audible tone/light emission/vibration/non-report) as well as keys for performing ordinary functions regarding transmission/reception, such as a numeric keypad for inputting dial numbers. The control unit 400 includes a microcomputer as a main control unit, and performs, by controlling each unit shown in FIG. 7, various kinds of control, such as establishment of mobile communication and edit control of the dial data stored in the memory unit 60, are performed in response to requests from the user issued from the key input unit 72.

Meanwhile, the control unit 400 is provided with a call processing unit 400a and a handover processing unit 400b. The call processing unit 400a transmits a call request to the mobile communication system S in response to a transmission operation by the user. When a handover instruction message is given to the next station through the base station CS being in connection, the handover unit 400b performs handover to the next base station CS at the time when the message is given, or at timing clearly specified in the message. Next, operations of the communication system S based on the aforementioned configuration will be described by dividing the operations into two embodiments.

[First Embodiment]

Figure 8:
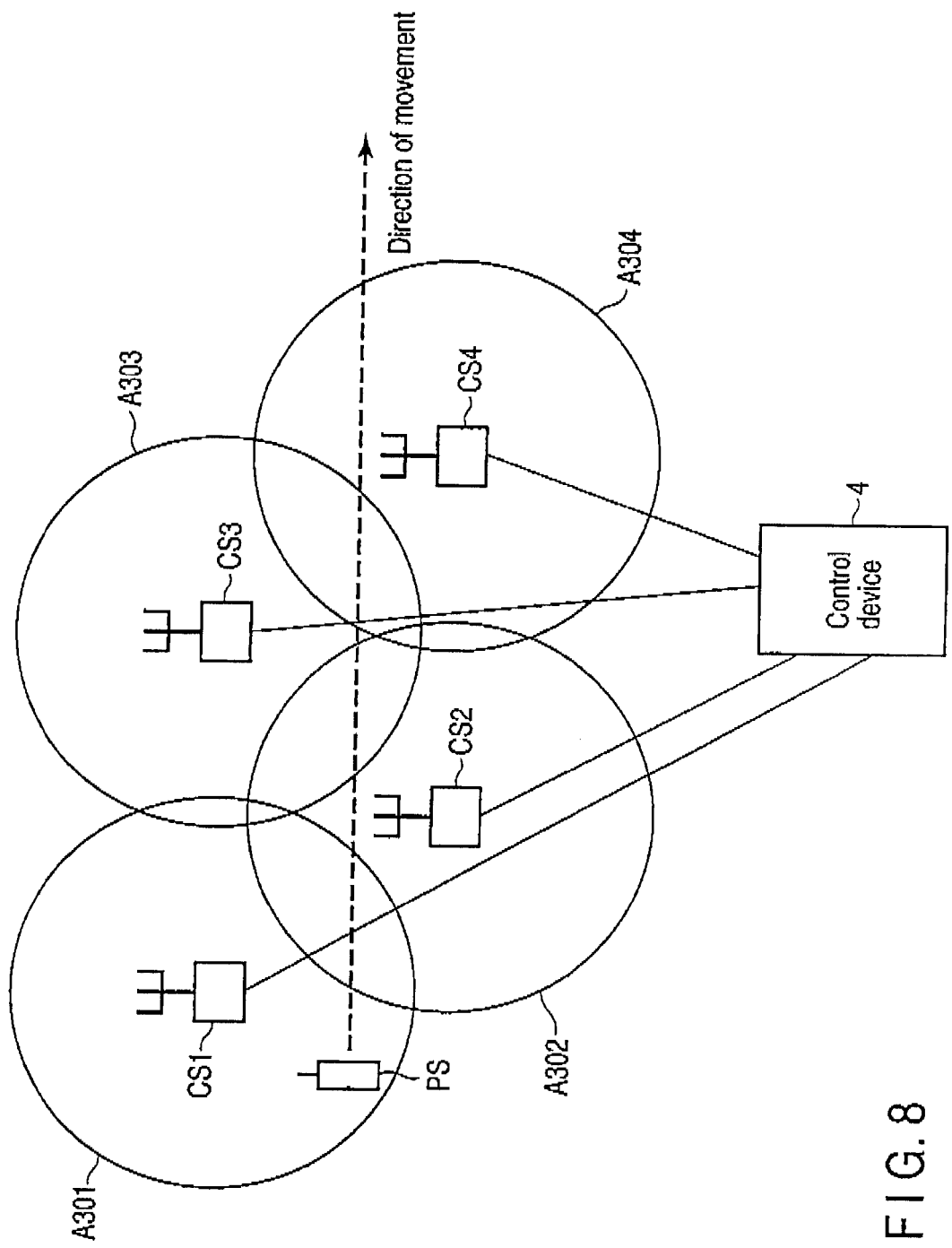
FIG. 8 is an exemplary schematic view depicting an example of an actual handover.

FIG. 8 shows a schematic view illustrating an example of an actual handover. In FIG. 8, it is assumed that the base stations CS1-CS4 form wireless communication areas (wireless zones) A301-A304, respectively, and the mobile terminal PS moves sequentially in the communication areas from the area A301 to the area A304. When reaching near a boundary between the area A301 and the area A302, the mobile terminal PS performs a handover to the base station CS2. The control unit 4 stores the time when the handover is performed. The time may be Japan Standard Time, or may be a time elapsed from a start of call communication. Similarly, the control device 4 also stores the time when the mobile terminal PS performs its handover to the base station CS3 and the time when the mobile terminal PS performs its handover to the base station CS4.

The control device 4 stores a period in which the mobile terminal PS communicates with the base station CS1, a period in which the mobile terminal PS communicated with the base station CS2, and a period in which the mobile terminal PS communicates with the base station CS 3 in a communication period 44c according to the time differences of the periods. The period in which the mobile terminal PS communicates with a first base station is not always considered for database construction because the time elapsed until the next handover is not regular. With reference to FIG. 8, it is clear that the time when a call made at the leftmost position in the wireless communication area A301 performs a handover to the base station CS2 and the time when a call made near the boundary between the wireless communication area A301 and the wireless communication area A302 performs a hand over to the base station CS2 are greatly different from each other. That is, there is no continuity between these periods; the periods are not suitable for information to generate a database.

Figure 9:
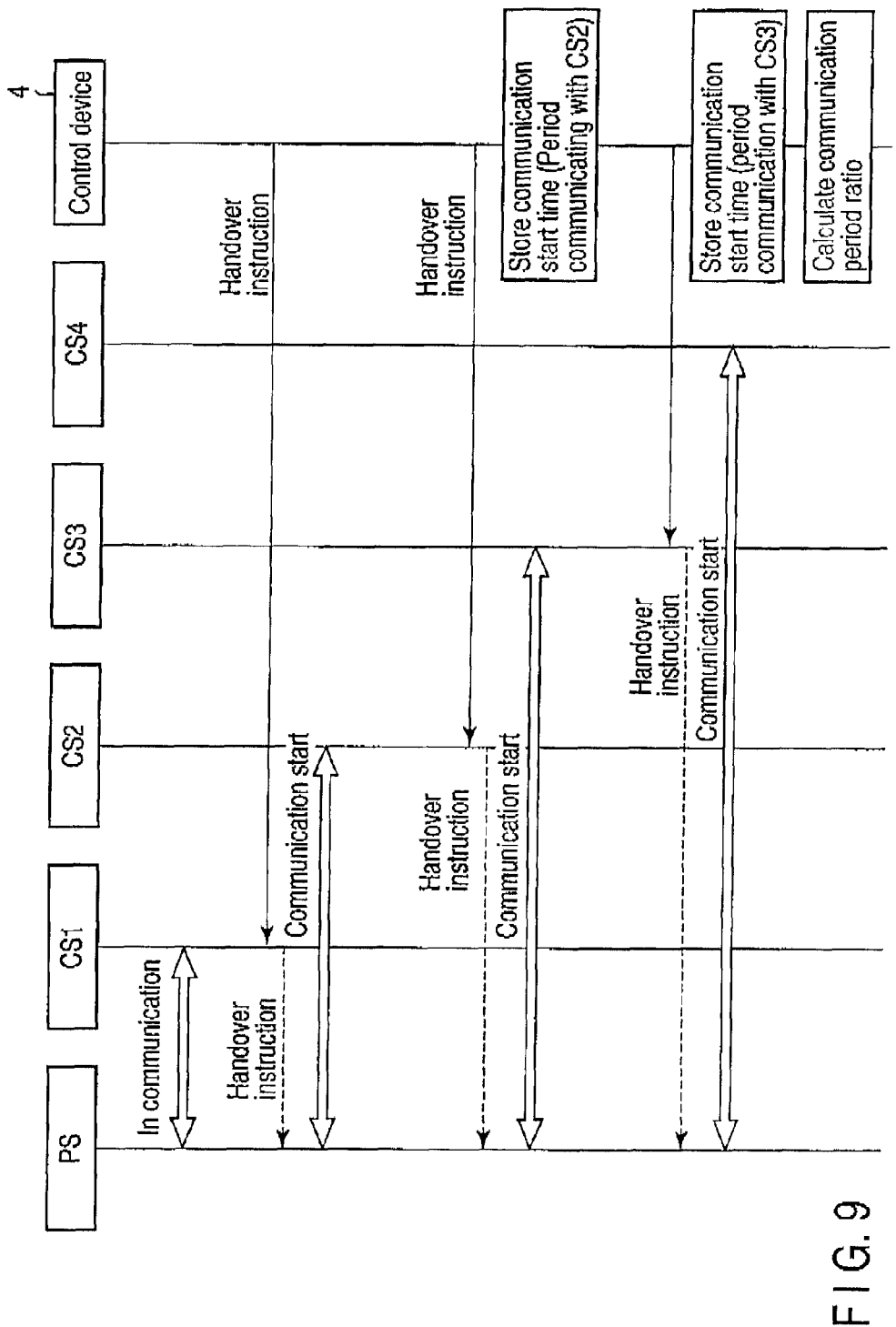
FIG. 9 is an exemplary sequence diagram depicting an example of a procedure regarding calculation of a communication period ratio.

FIG. 9 shows a sequence diagram illustrating an example of a procedure regarding calculation of a communication period ratio. The mobile terminal PS firstly communicates with the base station CS1, and performs a handover to the next base station CS2 in response to a handover instruction issued from the control device 4. When receiving a handover instruction while in communication with the base station CS2, the mobile terminal PS switches in turn the connection destination base stations in such a way to the next station CS3 and further to the next station CS4.

At this time, each communication start time for the base stations CS2, CS3, CS4 is all fixed, the control device 4 stores all the values. By using the stored values, the control device 4 calculates the communication period between the mobile terminal PS and the base station CS2, and the communication period between the mobile terminal PS and the base station CS3.

For instance, assuming that a period in which the mobile terminal PS communicates with the base station CS2 is 30 seconds, and that a period in which the mobile terminal PS communicates with the base station CS3 is 60 seconds, the communication period ratio becomes 1:2. While it is preferable for the ratio to be indicated by 1:X (X is an arbitrary numeric figure), the ratio is not limited to 1:X.

When calculating the communication period ratio, the control device 4 retrieves a base station concerning the calculation of the value from the statistical information database 44d shown in FIG. 5, and integrates past statistical values to re-register the data. For instance, it is assumed that the ratio between the communication period of the mobile terminal PS and the base station CS2 and the communication period of the identical mobile terminal PS and the base station CS3 has been calculated as 1:4. According to FIG. 5, the past ratio is 1:2, and the statistical number of times is 138. Thereby, the communication period ratio is calculated by the following formula:

$$\begin{aligned} \text{New communication period ration} &= 1:(\text{statistical information ratio} \times \\ &\quad \text{statistical frequency}) + \\ &\quad \text{communication period ratio}/ \\ &\quad (\text{statistical frequency} + 1) \\ &= 1:(2 \times 138) + 4/(138 + 1) \\ &= 1:2.01 \end{aligned}$$

The calculated numeric figure 2.01 is newly registered in the statistical information database 44d. In this way, the statistical information database 44d is updated while the history of the handovers is stored.

Referring to FIG. 10, prediction of a handover destination base station and its timing will be described in detail. In FIG. 10, the base stations CS1, CS2, CS3 are connected to the control unit 4 through the communication resources, and the base stations CS1, CS2, CS3 form the wireless communication areas A301, A302, A303, respectively, It is assumed that the mobile terminal PS moves to the wireless communication area A301 of the base station CS1 through a handover, and moves from the area A301 to the areas A302, A303 along the dotted line in the direction of the arrow. It is assumed that no base station is newly installed or removed after starting the construction of the statistical information database 44d shown in FIG. 5.

When the mobile terminal PS has performed the handover to the base station CS2, the next connection destination of the base station and its timing can be calculated with reference to the statistical information database 44d from the previous base station CS1, the present base station CS2 and the communication period in the area A301 of the base station CS1. Referring to FIG. 4, the base station which has moved at the next timing in order of CS1→CS2 is described in a lower stage shown in FIG. 4 in order of CS4, CS5, and CS3. It should be clear that the mobile terminal PS with the highest frequency of movements is the base station CS4 of which the frequency is described as 568. Since the numeric figure 568 indicates the highest frequency, it should be clear that the base station, to which the mobile terminal PS moving from the bases stations CS1 to CS2 performs its handover next time, may be the base station CS4 with the highest possibility.

In this way, the connection destination prediction unit 45d specifies permutation (CS1, CS2, CS3) with the highest frequency among the permutations in which the previous station (CS1) is the first station, and the present station (CS2) is the second station in the statistical information database 44d. The prediction unit 45d selects the third base station (CS3) as being predicted to be the next connection destination of the mobile terminal PS.

When the base station of the next connection destination is predicted by the prediction unit 45d, the timing of the handover is predicted by the timing prediction unit 45e. The timing prediction unit 45e calculates the communication period to the base station CS2 by prorating the communication period to the base station CS1 by a numeric FIG. 3 that is the communication period to be recorded in the specified permutation (CS1, CS2, CS3). For instance, if the communication period to the base station CS1 is 30 sec., since the communication period to the base station CS2 has a relationship of 1:3, prorating enables the communication period to of base station CS2 to be cleared as 90 sec. This means that the time from the handover of the mobile terminal PS to the base station CS2 to the time of the next handover is 90 sec.

When these items of the information are calculated, the handover control unit 45f instructs the handover to the predicted base station CS4 at least before the 90 sec. have elapsed to the mobile terminal PS. At this moment, if it is clear that it takes 3 sec. to form a link in the communication resource of the base station CS3, the link formation unit 45g starts to form the link in the communication resource of the base station CS4 after 87 sec. from the time when the mobile terminal PS has performed the handover to the base station CS2.

In this way, in the first embodiment, a plurality of mobile terminals PS5 in the mobile communication system repeat handover among base stations, and the statistical information database 44d is constructed with the storage of the history of the handovers. In the database 44d, the number of times of occurrences (or generation) of the permutation for each permutation in which three base stations are arranged in order of ordinal number and the communication period ratio of the same mobile terminal to the first base station and to the second base station in the permutation are associated with one another as parameters. The mobile terminal PS being in communication retrieves the statistical information database 44d by the order of the base stations which have performed handovers in the past, and then, specifies the base station with the highest possibility of the next handover on the basis of the frequency parameter. When the next base station is specified, the communication period to the immediately preceding base station is prorated by the communication period ratio parameter, and the timing of the occurrence of handover to the specified base station is decided.

The processing mentioned above is performed by the control device 4 in the communication system S. Therefore, the control device 4, which is a device in the communication system S, can predict the timing and the connection destination of the occurrence of handover, and the system side can execute the handover. That is, the handover control unit 45f of the control device 4 transmits an instruction message, and the mobile terminal PS which has received the message can realize the handover so as to respond to the instruction.

Accordingly, since it is not needed for the mobile terminal PS to detect the electric field strength and to decide the handover destination, the handover function of the mobile terminal PS may be reduced to the requisite minimum, thus terminal costs may be reduced. Furthermore, since the system side may issue an instruction by taking the initiative before the handover actually becomes necessary, even if the moving speed of the mobile terminal PS becomes faster, there is no risk in the handover performance deteriorating. Before the occurrence of handover, the link in the communication resource of the predicted base station CS may be formed.

That is, if the next station can be predicted, a call connection sequence for continuing the call (talking) can be made before the handover. This results in a large merit in a system requiring a complicated procedure such as Session Initiation protocol (SIP). Further, a failure in which communication is intercepted due to a delay of communication control after the start of handover connection may be eliminated, the speed-up of the communication may be promoted, and further, high-speed movement performance of the mobile terminal PS may be enhanced. In a case where the movement speed of the mobile terminal PS is fixed at a certain rate and the movement direction is almost fixed, such as a freeway or a bullet train, the control device 4 of the system provides an especially remarkable effect.

Since the system S starts to form the link at a communication resource part along to the predicted timing, the system S may release the resource concerning the link until the start of formation of the link. Thus, the resources can be used effectively.

Further, the statistical information database 44d records temporal statistical information, namely communication period ratios in addition to the frequency of the occurrences of the handovers, which enables predicting the timing of the handovers with high accuracy, based on the communication period ratios. The frequency itself is gradually biased to a specific permutation and the histories of the handovers are stacked, and the accuracy of the prediction of the handover destinations gradually increases. These situations make it possible to predict the base stations at the handover destinations with high accuracy. While the existing technique has posed a problem of accuracy of prediction, the foregoing embodiment enables resolving such a problem.

Since the existing technique manages the handover history of the portable terminal on the terminal side, the load on the terminal is heavy. Since the system predicts the handovers on the basis of the data transmitted and received to and from the base stations, the system also poses a problem of accuracy. Conversely, in the system of the embodiment, since the control device 4 leads to predict the handovers, both the distribution of loads and the improvement in the prediction accuracy may be achieved easily. Moreover, the communication system S makes it possible to predict any channel to which no mobile terminal PS has been connected. That is, even when the mobile terminal PS1 has not performed a handover from the base stations CS1 to CS2 and if there is a history in which other mobile terminals PSs have passed through such channels, the communication system S can specify the base station CS1 as the handover destination. This is a merit which can be obtained by including the statistical information database 44d not in the mobile terminal PS but in the control device 4, and by permitting the database 44d to be independent of the mobile terminal PS. Thus, the first embodiment makes it possible to provide a mobile communication system of which the high-speed movement performance is improved, its control device, the handover control method, and the mobile terminal.

[Second Embodiment]

Figure 11:
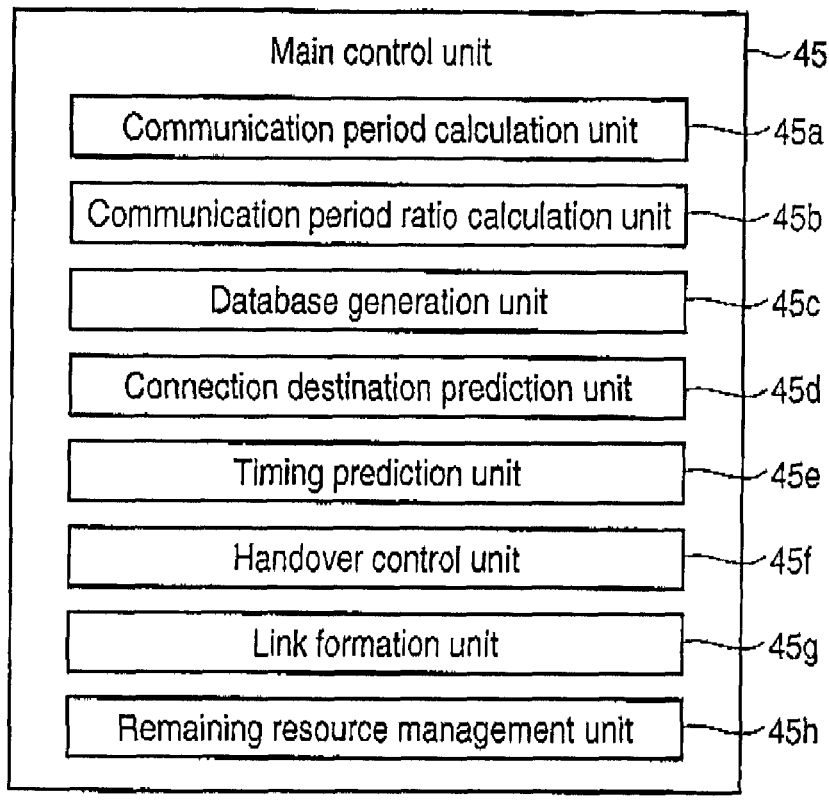
FIG. 11 is an exemplary block diagram depicting a function provided for a main control unit 45 of a second embodiment of the invention.
Figure 12:
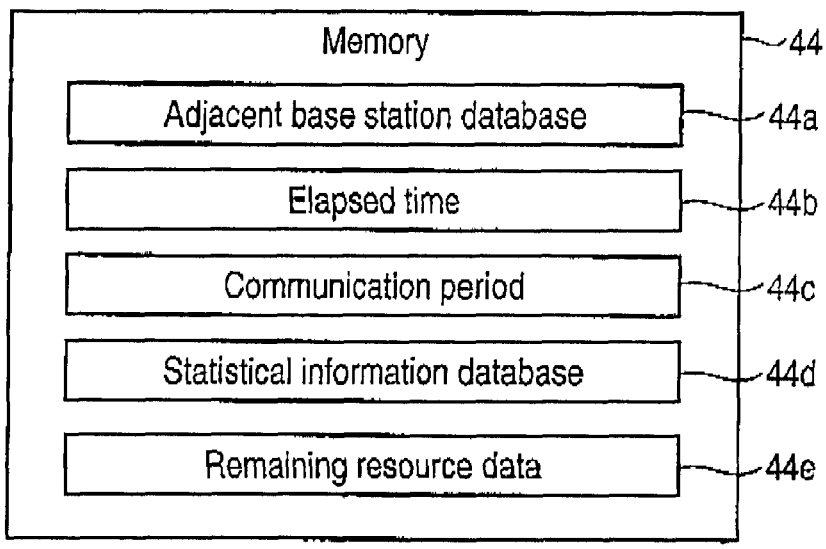
FIG. 12 is an exemplary view depicting an example of information stored in a memory 44 of the second embodiment of the invention.

FIG. 11 shows a block diagram illustrating functions provided for the main control unit 45 (control device 4) of the second embodiment of the invention. FIG. 12 shows a view illustrating an example of information to be stored in the memory 44 shown in FIG. 3 of the second embodiment. In FIG. 11, the same components as those in FIG. 3 are designated by the identical symbols, and in FIG. 12, the same components as those in FIG. 4 are designated by the identical symbols. Herein, solely different components will be described. In the second embodiment, the main control unit 45 has a remaining resource management unit 45h in addition to the configuration shown in FIG. 3. The resource management unit 45h has a function of recognizing the remaining resources amount varying every moment in real time. The resources include the remaining of the communication channels or the remaining number of links capable of being formed in the communication resources. The latest recognized remaining resource amount is stored in the remaining resource data 44e.

The connection destination prediction unit 45d predicts the base station of the next connection destination on the basis of a standard differing from that of the first embodiment. That is, the prediction unit 45d specifies a plurality of permutations in the descending order of frequency from the permutations to be recorded in the statistical information database 44d. The prediction unit 45d selects, as the next handover destination, the base station with the largest remaining source amount among the specified permutations. For instance, when the mobile terminal PS moves from the base station CS1 to CS2, according to FIG. 5, permutations (CS1, CS2, CS4) and (CS1, CS2, CS5) are specified as permutations with large frequencies. If the remaining resource amount of the base station CS5 is larger among these base stations, the prediction unit 45d selects the base station CS5 as the next handover destination.

Figure 13:
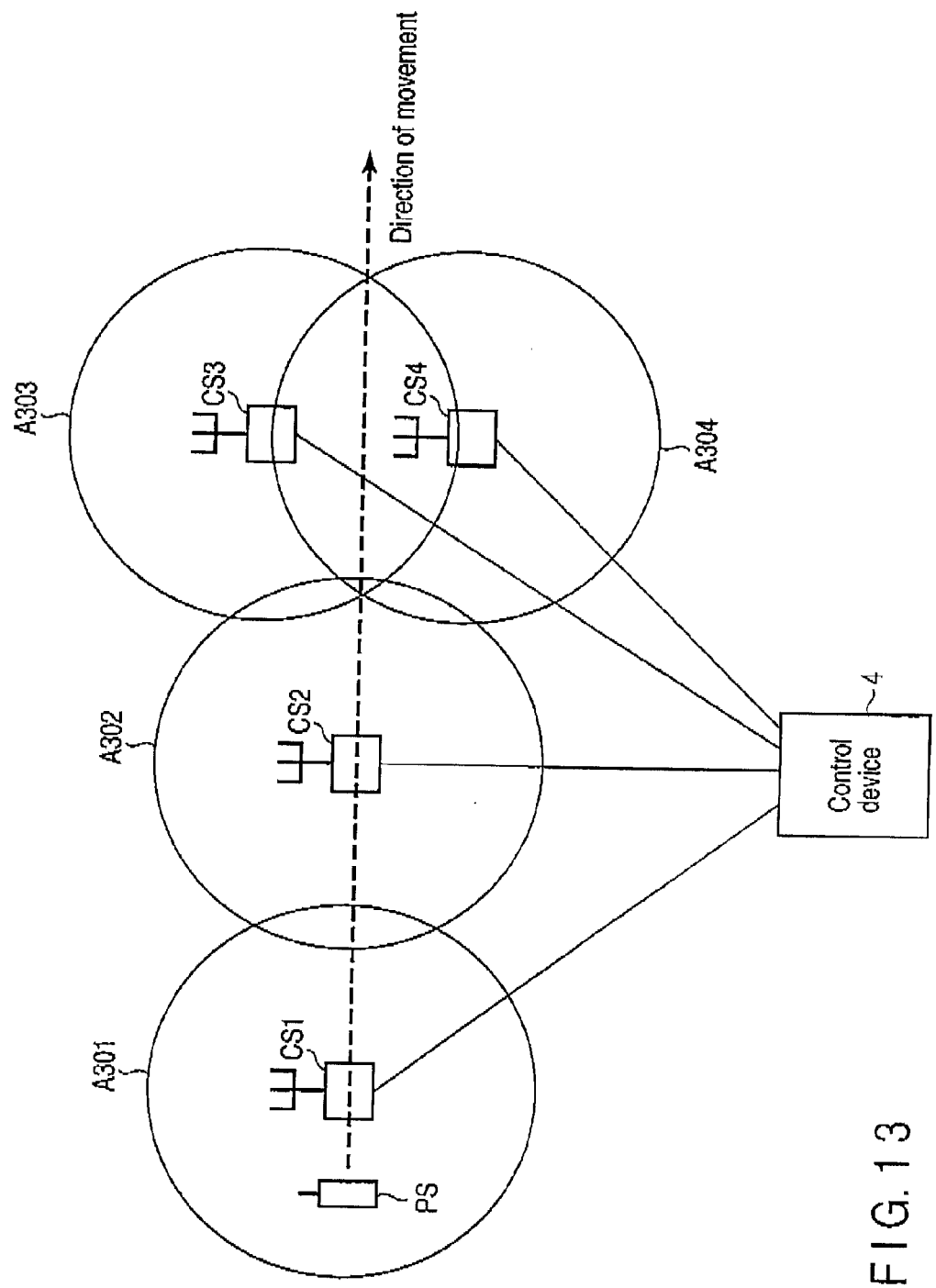
FIG. 13 is an exemplary schematic view depicting another example of the actual handover.

FIG. 13 shows a schematic view illustrating another example of an actual handover. In FIG. 13, the base stations CS1, CS2, CS3, CS4 are connected to the control device 4 through the communication resources, and the respective base stations CS1, CS2, CS3, CS4 form the wireless communication areas A301, A302, A303, A304, respectively. It is assumed that the mobile terminal PS moves to the wireless communication area A301 of the base station CS1 through a handover, and moves from the area A301 along the doted line in the arrow direction. Here, it is also assumed that no base station is newly installed and removed after the start of the construction of the statistical information database 44d.

When the mobile terminal PS performs a handover to the base station CS2, the base station of the next connection destination and its timing may be calculated from the previous base station CS1, the present base station CS1 and the communication period in the area A301 of the base station CS1 with reference to the statistical information database 44d. The prediction unit 45d specifies three base stations as candidates of the handover destinations. Referring now to FIG. 5, the base stations CS4, CS5, CS3 become the candidates of the specified three base stations, and the order is set to this order if the attention is focused on the frequency.

Meanwhile, the prediction unit 45d refers to the remaining resource data 44e if FIG. 12 to select the base station with the largest remaining resource amount among these candidates. If the remaining resource amount of the base station CS4 is the largest, the prediction unit 45d selects the base station CS4 as the next handover destination.

As the foregoing procedure, specifying the plurality of base stations as the candidates, and selecting the base station by assigning a hierarchy to the remaining resource amounts, the communication system S may avoid deviation from use of resource for each base station CS1-CSn. If one base station may be selected as the handover destination, the timing of the handover destination may be calculated in the same procedure as that of the first embodiment by using the communication period ratio.

In this way, the second embodiment manages the remaining resource amount for each base station CS1-CSn by means of accrual time. The statistical information database 44d specifies the plurality of base stations as the handover destinations. The second embodiment selects the base station with the largest remaining resource amount as the handover destination base station among the plurality of candidates.

Thereby, in addition to the same obtained merit as that of the first embodiment, the resources of the base stations CS1-CSn as well as the resources of the communication resource may be further effectively utilized. Therefore, the second embodiment may also provide a mobile communication system of which the high-speed movement performance is improved, its control device, a handover control method, and a mobile terminal.

The invention is not limited to the embodiments given above. For instance, after the link formation unit 45g forms the link to the communication resource, the talking may be terminated and the handovers may not been performed. In such a case, if the link is kept connected, since the resources cannot be effectively utilized, after the link formation, if a state of no handover is unchanged to a certain extent, the link may be released. After the link formation, if no handover is performed even when the timing of the handover comes, the link may be released similarly.

In generation of the statistical information database 44d shown in FIG. 5, to calculate the communication period ratio, it is considered for the communication period in handover to be effective. The invention is not limited to this, the time, which waits for the handover when the base station which has been waited by the mobile terminal PS is switched over, may be utilized.

Various methods may be used for sending the message to instruct the handover from the control device 4 to the mobile terminal PS. In the embodiment, the control device 4 transmits the instruction message to the mobile terminal PS through the base station CS immediately preceding the predicted timing. Or, the control device 4 may transmit the instruction message including time information of the timing to the mobile terminal PS through the base station CS, and perform the handover at the timing which has been read by the mobile terminal PS from the time information.

In addition to this, the base station CS may buffer the instruction message once. That is, the control device 4 transmits the instruction message including the time information of the timing of the handover to the present base station CS. The base station which has received the instruction message may read the timing from the time information, and may transmit an instruction of the handover to the mobile terminal PS at an appropriate time. Thereby, the control device 4 and the base station can distribute the loads.

Further, it is possible to consider that the previous station of the previous station may be used to predict the next station. By using the previous station of the previous station, the previous station and the present station to predict the next station, the improvement in the prediction accuracy maybe further achieved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is;

1. A mobile communication system comprising: a plurality of base stations each forming a wireless zone for wirelessly accommodating mobile terminals; and a control device accommodating the plurality of base stations through a communication resource for each base station, wherein
the control device comprises:
a construction module configured to construct a database regarding a history of handovers by the mobile terminals;
a prediction module configured to predict a base station of the next connection destination of a mobile terminal being in communication and timing of a handover to the base station of the next connection destination on the basis of the database; and an instruction module configured to issue an instruction that instructs the handover to the predicted base station to the mobile terminal being in communication before the timing comes, the database is one, for each permutation sequentially arranging three base stations, in which frequencies of occurrences of the permutations in the history of the handovers and statistical information showing a ratio between a communication period of the first base station in the permutation and of the mobile terminal and a communication period of the second base station of the permutation and of the mobile terminal are associated with one another, and the prediction module predicts the base station of the next connection destination on the basis of the frequencies, and predicts the timing on the basis of the statistical information.

2. The system according to claim 1, wherein the instruction module issues the instruction at the timing.

3. The system according to claim 1, wherein the instruction module issues the instruction through a message including time information showing the timing.

4. The system according to claim 1, wherein:

in case of the mobile terminal being in communication is called a present station, and a base station to which the mobile terminal is connected before the present station is called a previous station, the prediction module predicts the third station, in a permutation with the highest frequency among a permutation in which the previous station is the first base station and the present station is the second base station, as the base station of the next connection destination, predicts a communication period to the present station by prorating a communication period between the mobile terminal being in communication and the previous termination by the statistical information in the permutation with the highest frequency, and predicts the timing on the basis of the predicted communication period.

5. The system according to claim 1, wherein the control device further comprises recognition module configured to recognize individual remaining resource amounts of the plurality of the base stations, in case of a base station to which the mobile terminal being in communication is connected is called a present station, and a base station to which the mobile terminal is connected before the present station is called a previous station, the prediction module specifies a plurality of permutations in descending order of the frequencies from a permutation in which the previous station is the first base station and the present station is the second base station, selects a base station with the largest remaining resource amount among the third base stations in the specified permutations as the base station of the next connection destination, predicts a communication period of the present station by prorating a communication period between the mobile terminal being in communication and the previous station by the statistical information of a permutation including the selected base station, and predicts the timing on the basis of the communication period of the predicted present station.

6. The system according to claim 1, wherein the control device further comprises:

a link formation module configured to form a link to continue communication between the mobile terminal being in communication and its partner in a communication resource of the base station of the next connection destination prior to the timing.

7. The system according to claim 6, wherein the link formation module releases the link if a handover is not performed after passing the timing in the base station of the next connection destination.

8. A control device for accommodating a plurality of base stations each forming a wireless zone for wirelessly accommodating mobile terminals, respectively, through a communication resource for each base station, the control device comprising:

a construction module configured to construct a database regarding a history of handovers by the mobile terminals;

prediction module configured to predict a base station of the next connection destination of a mobile terminal being in communication and timing of a handover to the base station of the next connection destination on the basis of the database; and an instruction module configured to instruct the handover to the predicted base station to the mobile terminal being in communication before the timing comes, wherein the database is one, for each permutation sequentially arranging three base station, in which frequencies of occurrences of the permutations in the history of the handovers and statistical information showing a ratio between a communication period of the first base station in the permutation and of the mobile terminal and a communication period of the second base station of the permutation and of the mobile terminal are associated with one another, and the prediction module predicts the base station of the next connection destination on the basis of the frequency, and predicts the timing on the basis of the statistical information.

9. The device according to claim 8, wherein in case of the mobile terminal being in communication is called a present station, and a base station to which the mobile terminal is connected before the present station is called a previous station, the prediction module predicts the third station, in a permutation with the highest frequency among a permutation in which the previous station is the first base station and the present station is the second base station, as the base station of the next connection destination, predicts a communication period to the present station by prorating a communication period between the mobile terminal being in communication and the previous termination by the statistical information in the permutation with the highest frequency, and predicts the timing on the basis of the predicted communication period.

10. The device according to claim 8, further comprising:

a recognition module configured to recognize individual remaining resource amounts of the plurality of the base stations, wherein:

in case of a base station to which the mobile terminal being in communication is connected is called a present station, and a base station to which the mobile terminal is connected before the present station is called a previous station, the prediction module
specifies a plurality of permutations in descending order of the frequencies from a permutation in which the previous station is the first base station and the present station is the second base station,
selects a base station with the largest remaining resource amount among the third base stations in the specified permutations as the base station of the next connection destination,
predicts a communication period of the present station by prorating a communication period between the mobile terminal being in communication and the previous station by the statistical information of a permutation including the selected base station, and
predicts the timing on the basis of the communication period of the predicted present station.

11. The device according to claim 8, further comprising:
a link formation module configured to form a link to continue communication between the mobile terminal being in communication and its partner in a communication resource of the base station of the next connection destination prior to the timing.

12. The device according to claim 11, wherein
the link formation module releases the link if a handover is not performed after passing the timing in the base station of the next connection destination.

13. A handover control method for use in a mobile communication system comprising a plurality of base stations each forming a wireless zone for wirelessly accommodating mobile terminals; and a control device accommodating the plurality of base stations through communication resources for each base station, the handover control method comprising:
constructing a database, for each permutation sequentially arranging three base stations, in which frequencies of occurrences of the permutations in the history of the handovers and statistical information showing a ratio between a communication period of the first base station in the permutation and of the mobile terminal and a communication period of the second base station of the permutation and of the mobile terminal are associated with one another;
predicting a base station of the next connection destination of a mobile terminal being in communication;
calculating the timing of a handover to the predicted base station on the basis of the statistical information;
issuing an instruction that instructs the handover to the predicted base station to the mobile terminal being in communication before the timing comes; and
performing the handover by the mobile terminal to the predicted base station on the basis of the instruction.

14. The method according to claim 13, wherein
the instruction is issued at the timing to the mobile terminal; and
the mobile terminal performs the handover when the instruction is received.

15. The method according to claim 13, wherein
the instruction is issued to the mobile terminal by a message including time information showing the timing; and
the mobile terminal performs the handover at a time shown in the time information.

16. The method according to claim 13, wherein:
in case of the mobile terminal being in communication is called a present station, and a base station to which the mobile terminal is connected before the present station is called a previous station,
the predicting includes:
specifying a permutation with the highest frequency among a permutation in which the previous station is the first base station and the present station is the second base station; and
selecting the third base station as the base station of the next connection destination in the specified permutation, and
the calculating includes:
obtaining a communication period of the present station by prorating a communication period between the mobile terminal being in communication and the previous station by the statistical information of the specified permutation; and
calculating the timing on the basis of the obtained communication terminal.

17. The method according to the claim 13, further comprising:
recognizing individual remaining resource amounts of the plurality of the base stations, wherein:
in case of a base station to which the mobile terminal being in communication is connected is called a present station, and a base station to which the mobile terminal is connected before the present station is called a previous station,
the predicting includes;
specifying a plurality of permutations in descending order of the frequencies from a permutation in which the previous station is the first base station and the present station is the second base station; and
selecting a base station with the largest remaining resource amount among the third base stations in the specified permutations as the base station of the next connection destination, and
the calculating includes:
obtaining a communication period of the present station by prorating a communication period between the mobile terminal being in communication and the previous station by the statistical information of a permutation including the selected base station; and
calculating the timing on the basis of the obtained communication period.

18. The method according to claim 13, further comprising:
forming a link for continuing communication between the mobile terminal being in communication and its partner in a communication resource of the base station of the next connection destination prior to the timing.

19. The method according to claim 18, further comprising:
releasing the link if the handover is not performed after passing the timing in the base station of the next connection destination.

20. A mobile terminal moving by performing handovers among wireless zones individually formed by a plurality of base stations provided for a mobile communication system, the mobile terminal comprising:
a handover processing unit which performs the handovers at a timing based on instructions received from the mobile communication system through the base stations,
wherein the mobile communication system includes a control device for accommodating the plurality of base stations,
the control device comprises:
construction module configured to construct a database regarding a history of handovers by the mobile terminals;

prediction module configured to predict a base station of the next connection destination of a mobile terminal being in communication and a timing of a handover to the base station of the next connection destination on the basis of the database; and instruction module configured to issue an instruction that instructs handover to the predicted base station to the mobile terminal being in communication before the timing comes, the database is one, for each permutation sequentially arranging three base stations, in which frequencies of occurrences of the permutations in the history of the handovers and statistical information showing a ratio between a communication period of the first base station in the permutation and of the mobile terminal and a communication period of the second base station of the permutation and of the mobile terminal are associated with one another, the prediction module
predicts the base station of the next connection destination on the basis of the frequency, and predicts the timing on the basis of the statistical information, and the handover processing module performs the handover on the basis of the instruction from the instruction module.

21. The terminal according to claim 20, wherein the instruction module issues the instruction at the timing, and the handover processing module performs the handover when the instruction is received.

22. The terminal according to claim 20, wherein
the instruction module issues the instruction by a message including time information showing the timing, and
the handover processing unit performs the handover at timing of the time information included in the message.

* * * * *

UNITED STATES PATENT AND TRADEMARK OFFICE
CERTIFICATE OF CORRECTION

PATENT NO.       : 8,218,504 B2
APPLICATION NO.  : 12/510522
DATED            : July 10, 2012
INVENTOR(S)      : Yamamoto et al.

It is certified that error appears in the above-identified patent and that said Letters Patent is hereby corrected as shown below:

Claim 8, column 16, line 29, change "three base station" to --three base stations--.

Claim 17, column 18, line 27, change "includes;" to --includes:--.

Signed and Sealed this
Eleventh Day of September, 2012

David J. Kappos
*Director of the United States Patent and Trademark Office*